US012247723B2

(12) United States Patent
Xiao et al.

(10) Patent No.: US 12,247,723 B2
(45) Date of Patent: Mar. 11, 2025

(54) LIGHT STRIP CONNECTOR AND LIGHT STRIP

(71) Applicants: SUZHOU OPPLE LIGHTING CO., LTD., Suzhou (CN); OPPLE LIGHTING CO., LTD., Shanghai (CN)

(72) Inventors: Liuhua Xiao, Suzhou (CN); Chaoguang Li, Suzhou (CN)

(73) Assignees: SUZHOU OPPLE LIGHTING CO., LTD., Suzhou (CN); OPPLE LIGHTING CO., LTD., Shanghai (CN)

(*) Notice: Subject to any disclaimer, the term of this patent is extended or adjusted under 35 U.S.C. 154(b) by 0 days.

(21) Appl. No.: 18/597,607

(22) Filed: Mar. 6, 2024

(65) Prior Publication Data

US 2024/0288151 A1 Aug. 29, 2024

Related U.S. Application Data

(63) Continuation of application No. PCT/CN2022/127603, filed on Oct. 26, 2022.

(30) Foreign Application Priority Data

Nov. 11, 2021 (CN) ......................... 202122754711.6

(51) Int. Cl.

| | |
|---|---|
| ***F21V 21/005*** | (2006.01) |
| ***F21S 4/20*** | (2016.01) |
| ***F21V 23/06*** | (2006.01) |

(52) U.S. Cl.

CPC ............. *F21V 21/005* (2013.01); *F21S 4/20* (2016.01); *F21V 23/06* (2013.01)

(58) Field of Classification Search

CPC ........ F21V 21/005; F21V 23/06; F21V 21/00; F21V 23/00; F21S 4/20; F21S 4/00;

(Continued)

(56) References Cited

U.S. PATENT DOCUMENTS

| | | | | |
|---|---|---|---|---|
| 9,239,136 | B1 * | 1/2016 | Petersen | F21V 23/06 |
| 9,909,743 | B2 * | 3/2018 | Dankelmann | F21V 21/005 |

(Continued)

FOREIGN PATENT DOCUMENTS

| | | |
|---|---|---|
| CN | 102109152 A | 6/2011 |
| CN | 204254359 U | 4/2015 |

(Continued)

OTHER PUBLICATIONS

International Search Report of PCT Application No. PCT/CN2022/127603, dated Jan. 18, 2023 with English translation, (11p).

*Primary Examiner* — Bao Q Truong

(74) *Attorney, Agent, or Firm* — Arch & Lake LLP; Hao Tan; Shen Wang

(57) ABSTRACT

The present disclosure provides a light strip connector and a light strip, the light strip connector is used for connecting adjacent light strips and/or connecting alight strip and a power cord, the light strip includes a light strip body. The light strip connector includes a cover closure portion, a base and at least one electrical connection structure; a receiving space is formed between the cover closure portion and the base, the electrical connection structure is in the receiving space, and the electrical connection structure includes a conductive terminal electrically connected to the light strip body, and a fixing portion fixedly connected to the conductive terminal; a fixing groove is provided on the base, the fixing portion is at least partially received in the fixing groove, and an accommodating space for accommodating (Continued)

the light strip body is provided between the conductive terminal and the fixing portion.

10 Claims, 8 Drawing Sheets

(58) Field of Classification Search
CPC ..... F21S 4/24; H01R 12/772; H01R 12/7023; H01R 13/2442; H01R 13/5833; F21Y 2103/10; F21Y 2115/10
See application file for complete search history.

(56) References Cited

U.S. PATENT DOCUMENTS

| | | | | |
|---|---|---|---|---|
| 10,024,526 | B1 * | 7/2018 | Dankelmann | F21V 23/06 |
| 10,582,616 | B1 * | 3/2020 | Chen | H01L 33/62 |
| 2010/0008090 | A1 * | 1/2010 | Li | F21V 23/06 362/249.02 |
| 2015/0241035 | A1 * | 8/2015 | Dankelmann | F21V 21/005 439/725 |
| 2016/0053973 | A1 * | 2/2016 | Tress | F21S 4/28 362/217.02 |
| 2020/0200339 | A1 | 6/2020 | Mostoller et al. | |

FOREIGN PATENT DOCUMENTS

| | | | |
|---|---|---|---|
| CN | 207500875 | U | 6/2018 |
| CN | 208222461 | U | 12/2018 |
| CN | 210219680 | U | 3/2020 |
| CN | 212783942 | U | 3/2021 |
| CN | 214254826 | U | 9/2021 |
| CN | 216591196 | U | 5/2022 |
| CN | 216591197 | U | 5/2022 |
| WO | WO2021069363 | A1 | 4/2021 |

* cited by examiner

LIGHT STRIP CONNECTOR AND LIGHT STRIP

CROSS-REFERENCE TO RELATED APPLICATION

This application claims the priority of PCT patent application No. PCT/CN2022/127603 filed on Oct. 26, 2022 which claims the priority of the Chinese patent application with an application number 202122754711.6, filed on Nov. 11, 2021, and the entire contents of which are incorporated by reference herein for all purposes.

TECHNICAL FIELD

The present disclosure relates to the technical field of light strips, and in particular to a light strip connector and a light strip.

BACKGROUND

Light strips are used more and more widely, especially low-voltage light strips. Low-voltage light strips can be cut infinitely, there are the following two ways for the cut light strips to achieve electrical conduction: one is welding, and the disadvantage of welding is that it requires a soldering iron during construction and the operation is very troublesome; the other is to use a light strip connector, which can quickly achieve electrical conduction and facilitate installation.

SUMMARY

The present disclosure provides a light strip connector and a light strip.

The present disclosure provides a light strip connector, for connecting adjacent light strips and/or connecting a light strip and a power cord, the light strip may include a light strip body, and the light strip connector may include a cover closure portion, a base and at least one electrical connection structure; a receiving space may be formed between the cover closure portion and the base, the electrical connection structure may be in the receiving space, and the electrical connection structure may include a conductive terminal electrically connected to the light strip body, and a fixing portion fixedly connected to the conductive terminal; a fixing groove may be provided on the base, the fixing portion may be at least partially received in the fixing groove, and an accommodating space for accommodating the light strip body may be provided between the conductive terminal and the fixing portion.

The present disclosure further provided a light strip, the light strip that may include a light strip body and the light strip connector as described above, an end of the light strip body provided with a second electrical connection portion abuts against a partition of the light strip connector, and the second electrical connection portion may be electrically connected to a first electrical connection portion of the light strip connector under a snap connection between the cover closure portion and the base of the light strip connector; and the light strip body may include a substrate and a light-emitting component electrically connected to the substrate, and two electrical connection structures of the light strip connector may be on both sides of the light-emitting component.

It is to be understood that both the foregoing general description and the following detailed description are exemplary and explanatory only and are not restrictive of the present disclosure.

BRIEF DESCRIPTION OF THE DRAWINGS

The technical solutions and other beneficial effects of the present disclosure will be apparent through a detailed description of the examples of the present disclosure in conjunction with the drawings.

DETAILED DESCRIPTION

Figure 1:
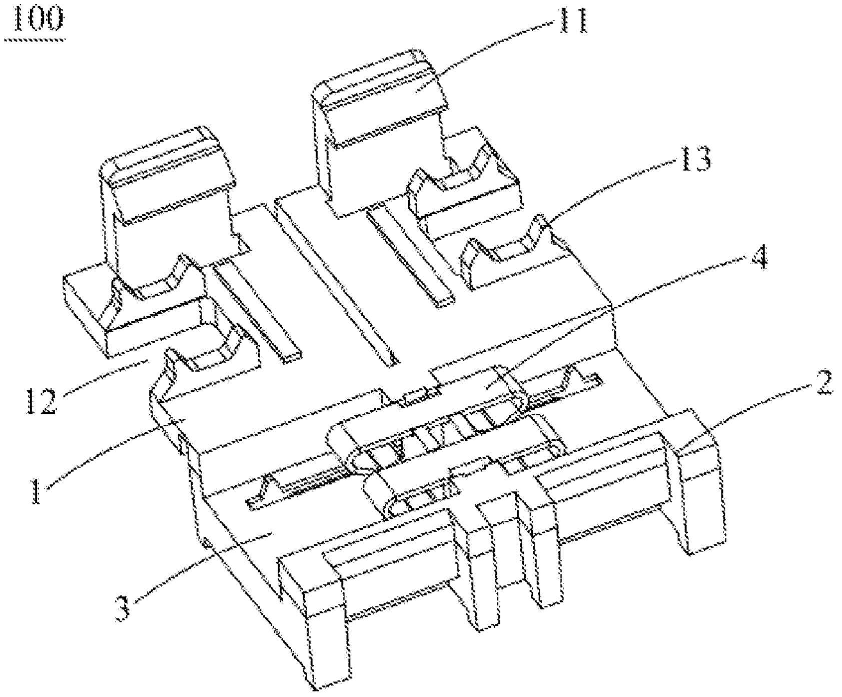
FIG. 1 is a structural schematic diagram of a light strip connector according to an example of the present disclosure.
Figure 2:
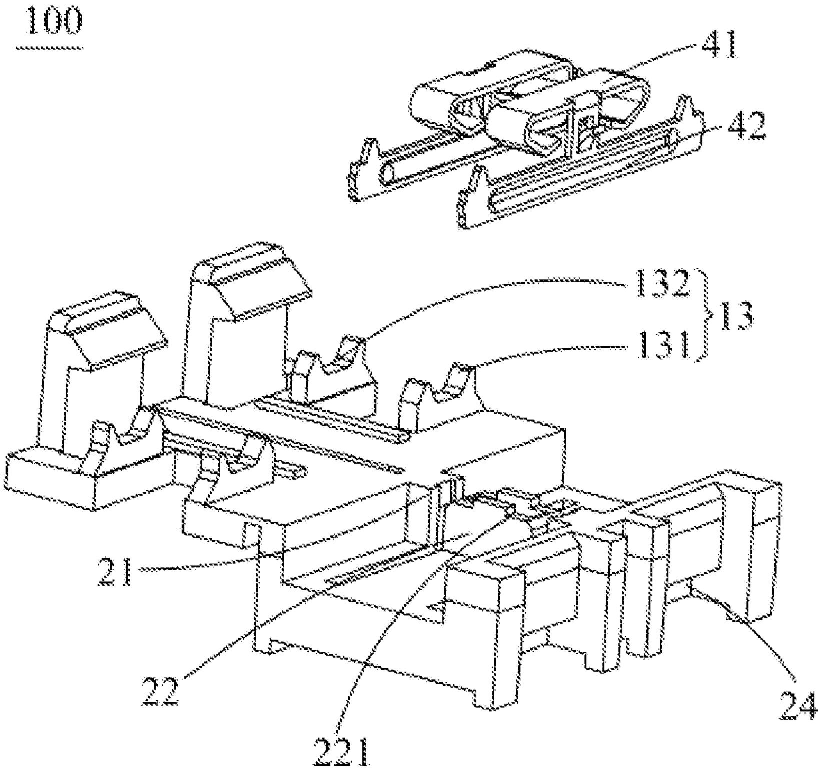
FIG. 2 is an exploded view of FIG. 1.
Figure 3:
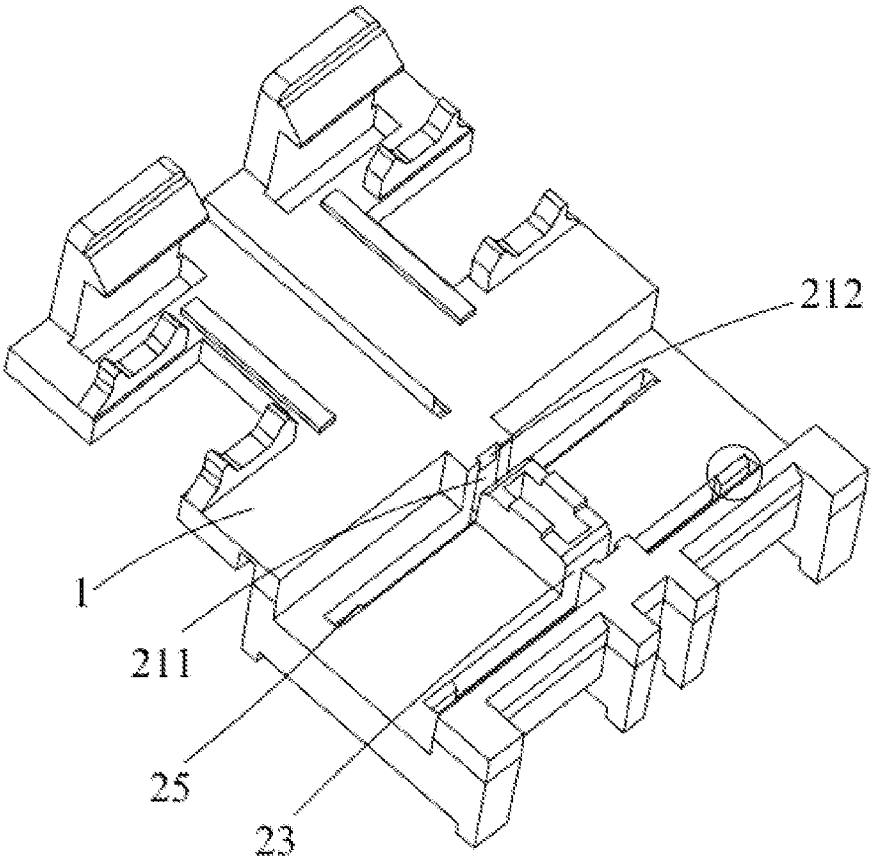
FIG. 3 is a structural schematic diagram of a cover closure portion and a base.
Figure 4:
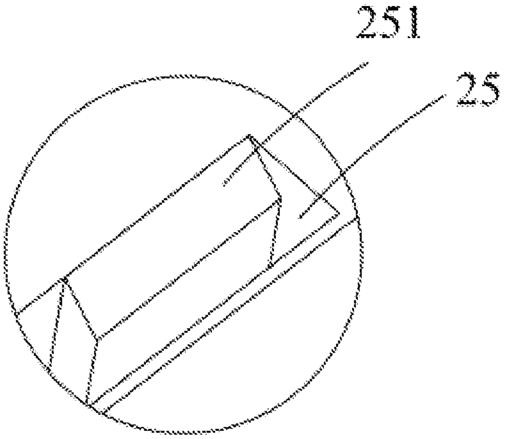
FIG. 4 is an enlarged view of a structure of the circled part in FIG. 3.

In order to make objects, technical solutions and advantages of the present disclosure apparent, the present disclosure will be described in detail below with reference to the drawings and examples.

It should be noted that, in order to avoid blurring the present disclosure with unnecessary details, only the structures and/or processing steps closely related to the solutions of the present disclosure are illustrated in the drawings, and other details that are not closely related to the present disclosure are omitted.

Furthermore, it should be noted that the terms "comprise," "comprising," "include," "including," etc., or any other variant thereof are intended to cover non-exclusive inclusion, such that a process, method, article or device including a set of elements includes not only those elements, but also other elements not expressly listed, or other elements that are inherent to such process, method, article or device.

The following problems are common for strip connectors: first, the elasticity of the spring sheet is poor; due to the requirement of the number of times of plug connection, it is hoped that the spring sheet can have good elasticity; on the other hand, the light strips are available with adhesive and non-adhesive backing, and the thickness of the adhesive backing varies greatly, so the elasticity of the spring sheet is required, and it is hoped that the spring sheet can be compatible with light strips of different thicknesses; secondly, the light strip cannot prevent pulling and dragging, and the light strip is easy to detach from the light strip connector, thus affecting the reliability of the electrical contact of the light strip; or, the light strip can prevent pulling and dragging but cannot satisfy the situation where the lamp beads are arranged densely. Therefore, how to improve the reliability of the light strip connector has become an urgent problem that needs to be solved. Thus, it is indeed necessary to provide a light strip connector and a light strip to solve the above-mentioned problems.

Please refer to FIG. 1 to FIG. 9 and in conjunction with FIG. 10 to FIG. 17, a light strip connector 100 provided by the present disclosure is used for connecting adjacent light strips 200 and/or connecting the light strip 200 and a power cord, and the light strip 200 includes a light strip body 5. The light strip connector 100 includes a cover closure portion 1, abase 2 and at least one electrical connection structure 4. A receiving space 3 is formed between the cover closure portion 1 and the base 2, and the electrical connection structure 4 is in the receiving space 3. The end of the receiving space 3 has an open structure, so that the light strip body 5 can abut against a partition 22 in the receiving space 3. The electrical connection structure 4 includes a conductive terminal 41 electrically connected to the lamp strip body 5, and a fixing portion 42 fixedly connected to the conductive terminal 41. A fixing groove 25 is provided on the base 2, and the fixing portion 42 is at least partially received in the fixing groove 25, and an accommodating space 6 for accommodating the lamp strip body 5 is provided between the conductive terminal 41 and the fixing portion 42.

A rotating structure is formed between the cover closure portion 1 and the base 2, and the rotation range of the rotating structure is 0° ~180°. The cover closure portion 1 and the base 2 can be opened or closed through the rotating structure, so that the light strip 200 can be easily placed, which facilitate operation. In an example, the rotating structure is a thin plate, for example, the thin plate is a plastic thin plate. In other examples, the rotating structure may be a rotating shaft or other components capable of realizing the rotating function, and may be specifically set according to actual usage requirements, which is not further limited in the present disclosure. For example, the cover closure portion 1 and the base 2 are made of plastic to enhance the plasticity of the product. For example, the cover closure portion 1, the thin plate and the base 2 are an integral injection molding structure, which is beneficial to mass production by producers and high production efficiency. Moreover, it is also convenient for users to use. The cover closure portion 1 and the base 2 are rotationally connected through the plastic thin plate, which can effectively make the cover closure portion 1 rotate around the base 2 to facilitate disassembly and/or fastening, snap-fit operations. In other examples, the cover closure portion 1, the thin plate and the base 2 may also adopt a split joint connection structure.

The cover closure portion 1 includes a first snap portion 11 and an opening 12. The first snap portion 11 is used to cooperate with a second snap portion 24 of the base 2 to realize the snap-closure of the cover closure portion 1 on the base 2. For example, the cover closure portion 1 is provided with two symmetrically arranged first snap portions 11. The number of openings 12 is two, and the openings 12 are located on the sides of the first snap portions 11 close to the rotating structure. In an example, the width of the opening 12 is slightly larger than the width of a light-emitting component 512 on the lamp strip body 5, in this way, the interference of a matching portion 13 on the light-emitting component 512 can be effectively reduced, so as to adapt to the dense arrangement of the light-emitting components 512 and satisfy the user's experience.

A side of the cover closure portion 1 close to the base 2 is provided with the matching portion 13 that matches a first convex portion 4222, in other words, the matching portion 13 is formed at the opening 12 of the cover closure portion 1 and extends toward the direction of the receiving space 3. The matching portion 13 is used to perform cooperating extrusion on the light strip body 5 with the first convex portion 4222 to achieve anti-pulling fixation of the light strip body 5.

Specifically, the matching portion 13 includes a groove 132 and a second convex portion 131 at both ends of the groove and extending in a direction away from the cover closure portion 1. The projection of the first convex portion 4222 on the cover closure portion 1 is in the groove 132, and the plane where the highest point of the first convex portion 4222 is located is higher than the plane where the lowest point of the second convex portion 131 is located. In this way, the light strip body 5 can be extruded into an "S" shape and received into the accommodating space 6, thereby achieving anti-pulling fixation of the light strip body 5. In other words, the light strip body 5 is deformed under the cooperating extrusion of the matching portion 13 and the first convex portion 4222 to be limited in the groove 132. In an example, the number of the second convex portions 131 is two, and the groove 132 is formed between the two second convex portions 131. For example, the two second convex portions 131 are both tooth-like structures, and outer side walls of the two second convex portions 131 are both inwardly concave structures, so as to be accommodated in the receiving space 3 and improve the overall consistency of the light strip 200. Moreover, it can also save materials, reduce production costs, and improve economic benefits. For example, the two second convex portions 131 both face the same direction. In other examples, the structures of the two second convex portions 131 may not be exactly the same, which is not limited by the present disclosure.

The base 2 is provided with an auxiliary portion 21 and a partition 22 at a position corresponding to a support portion 421, the partition 22 is in the receiving space 3. A gap 23 is provided between the partition 22 and a side wall of the base 2, and the electrical connection structure 4 is at least partially received in the fixing groove 25 after the electrical connection structure 4 passes through the gap 23. That is, it needs to be ensured that the first convex portion 4222 of the electrical connection structure 4 is exposed in the receiving space 3. Furthermore, the partition 22 is between two auxiliary portions 21, and gaps 23 are respectively formed between both sides of the partition 22 and the two auxiliary portions 21, and the fixing portion 42 passes through the gap 23 and is fixedly connected to the base 2. The upper surface of the partition 22 is provided with a step portion 221 to support the conductive terminal 41. In an example, the partition 22 is a blind hole structure, and the side wall of the partition 22 can abut against the light strip body 5, thereby saving materials and reducing production costs. Of course, in other examples, the partition 22 may also be a solid structure, which can be determined specifically according to actual requirements, the present disclosure is not limited here. In addition, the auxiliary portion 21, the partition 22 and the base 2 may also be an integral extrusion molding structure. For example, the number of the auxiliary portions

21 is two, and the two auxiliary portions 21 are symmetrically arranged on the inner wall, on the long side, of the base 2.

The base 2 is provided with a second snap portion 24 at a position corresponding to the first snap portion 11, and the second snap portion 24 matches the first snap portion 11 to realize the snap-closure of the cover closure portion 1. In one example, the first snap portion 11 is a protrusion block, and the second snap portion 24 is a snap groove. In other examples, the first snap portion 11 is a snap groove, and the second snap portion 24 is a protrusion block. Of course, the structures of the first snap portion 11 and the second snap portion 24 in the present disclosure are only exemplary and should not be limited thereto, as long as the cover closure portion 1 can be closed on the base 2.

The conductive terminal 41 includes a base portion 411 and an elastic portion 412 formed by bending an end of the base portion 411 toward a side close to the base 2, and the elastic portion 412 is provided with a first electrical connection portion 413. For example, the lowest point of the elastic portion 412 is provided with the first electrical connection portion 413, and the light strip body 5 is provided with a second electrical connection portion 511 at a position corresponding to the first electrical connection portion 413. The cover closure portion 1 will press the conductive terminal 41 when the cover closure portion 1 is closed, and the conductive terminal 41 is electrically connected to the light strip body 5 under the cooperation of the first electrical connection portion 413 and the second electrical connection portion 511. In other words, the second electrical connection portion 511 is electrically connected to the first electrical connection portion 413 under the elastic resistance of the elastic portion 412. In this way, with the sufficient deformation of the elastic portion 412 itself, the reliability of the electrical contact between the light strip body 5 and the conductive terminal 41 can be effectively improved.

For example, the elastic portion 412 and the first convex portion 4222 are provided on the same electrical connection structure 4, thus improving the installation efficiency. Of course, in other examples, the elastic portion 412 and the first convex portion 4222 may also be provided separately.

The fixing portion 42 includes a support portion 421 fixedly connected below the conductive terminal 41 and a connection portion 422 below the support portion 421, a side wall of the support portion 421 close to the base 2 is provided with a first snap portion 4211, the base 2 is provided with a second snap portion 211 at a position corresponding to the first snap portion 4211, and the support portion 421 is snap-connected to the base 2 through the snap-fitting of the first snap portion 4211 and the second snap portion 211.

In an example, the first snap portion 4211 is a barb, and the second snap portion 211 is a limiting groove. The barb is on a side of the support portion 421 close to the auxiliary portion 21, and the connection point between the barb and the support portion 421 is below the end of the barb. For example, a blocking wall 212 is provided above the limiting groove. When the electrical connection structure 4 moves to the blocking wall 212, the barb is subjected to squeezing pressure to lean toward the support portion 421, and when the end of the barb crosses the blocking wall 212, the external squeezing pressure disappears, and the barb restores its own deformation, so as to be accommodated in the limiting groove. This arrangement facilitates the first snap portion 4211 to enter the second snap portion 211 from the blocking wall 212, which improves the convenience of installation and increases the installation efficiency.

The end of the fixing portion 42 away from the electrical connection structure 4 is provided with a first convex portion 4222 extending in a direction close to the cover closure portion 1. For example, in the direction perpendicular to the light strip body 5, the plane where the lowest point of the elastic portion 412 is located is lower than the plane where the highest point of the first convex portion 4222 is located. Such an arrangement can well realize the reliability of the electrical contact between the light strip body 5 and the conductive terminal 41 as well as the good anti-pulling fixing effect on the light strip body 5.

Figure 5:
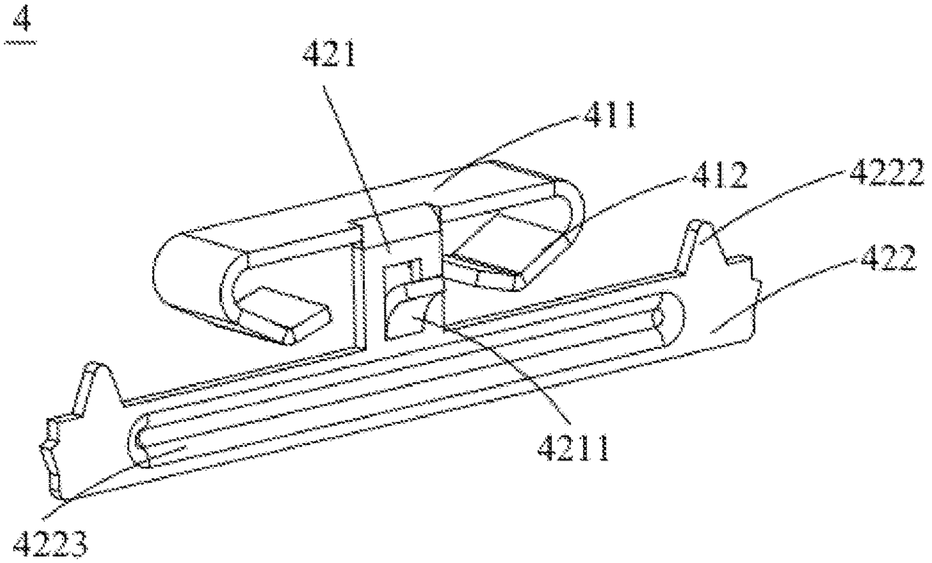
FIG. 5 is a structural schematic diagram of an electrical connection structure.
Figure 6:
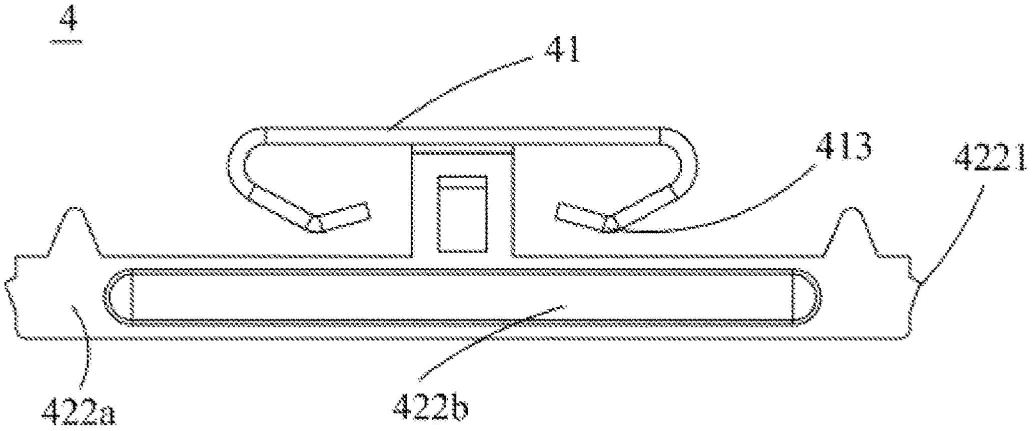
FIG. 6 is a front view of FIG. 5.
Figure 7:
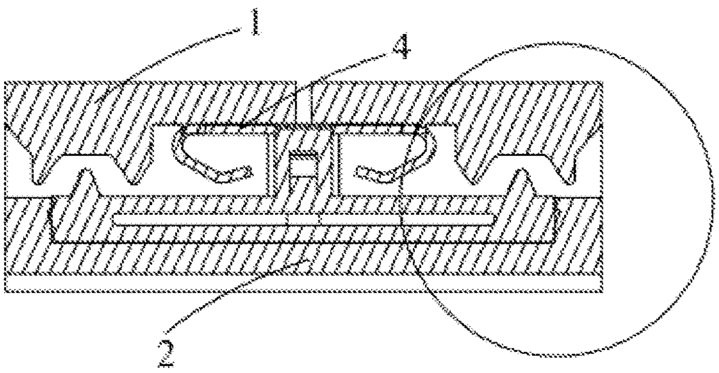
FIG. 7 is a cross-sectional view of a light strip connector.
Figure 8:
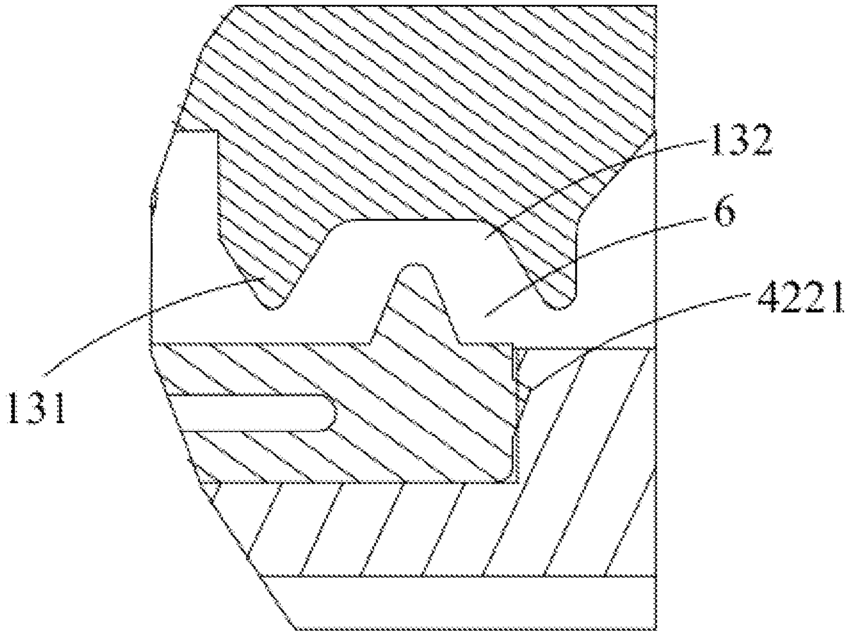
FIG. 8 is an enlarged view of a structure of the circled part in FIG. 7.
Figure 9:
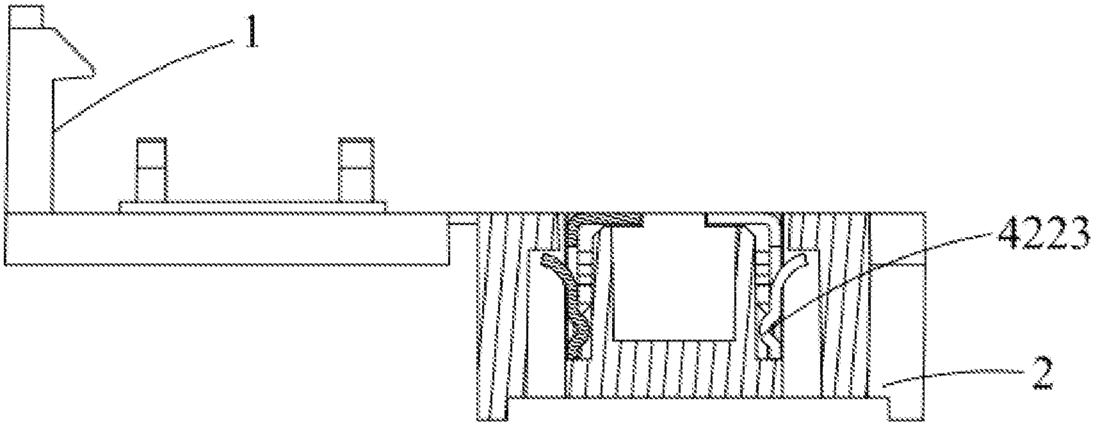
FIG. 9 is a partial cross-sectional view of a light strip connector.
Figure 10:
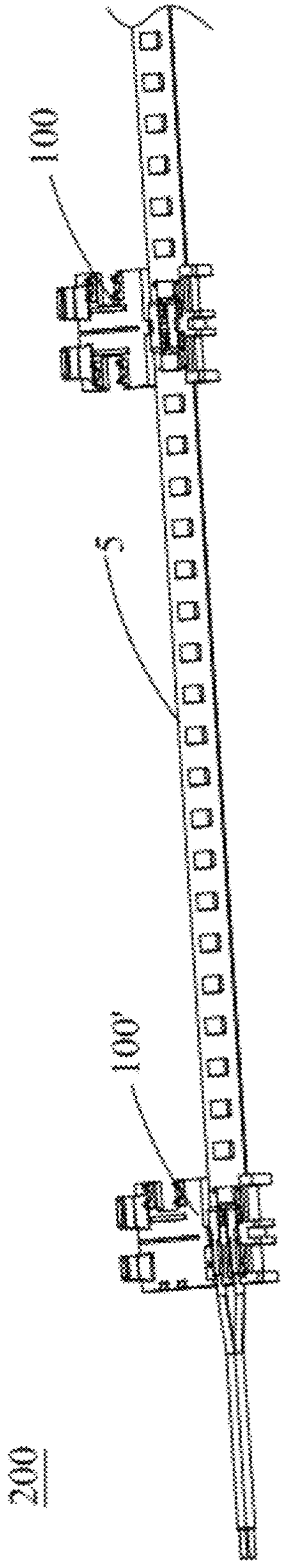
FIG. 10 is a structural schematic diagram of a light strip according to an example of the present disclosure.
Figure 11:
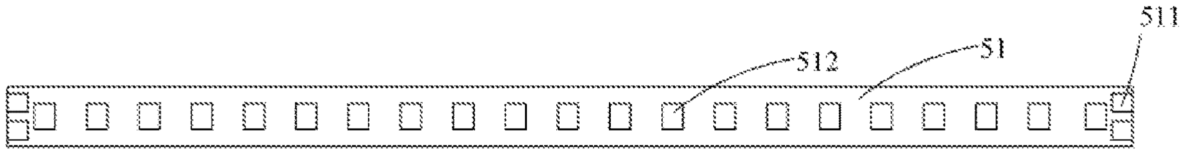
FIG. 11 is a structural schematic diagram of a substrate of a light strip.
Figure 12:
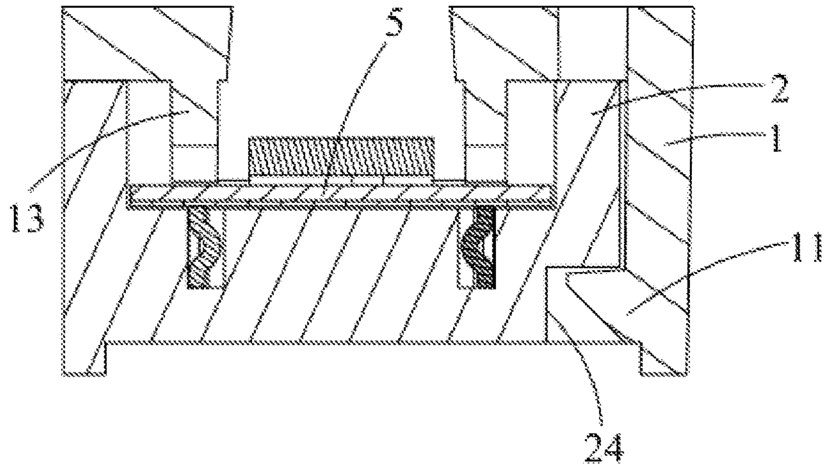
FIG. 12 is a first cross-sectional view of a light strip.
Figure 13:
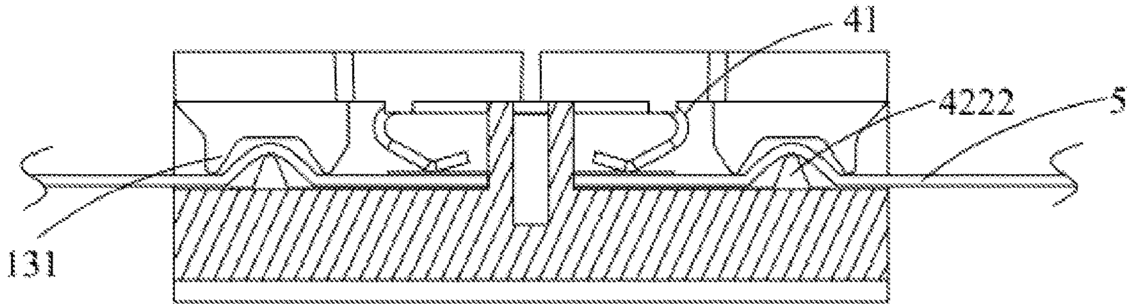
FIG. 13 is a second cross-sectional view of a light strip.
Figure 14:
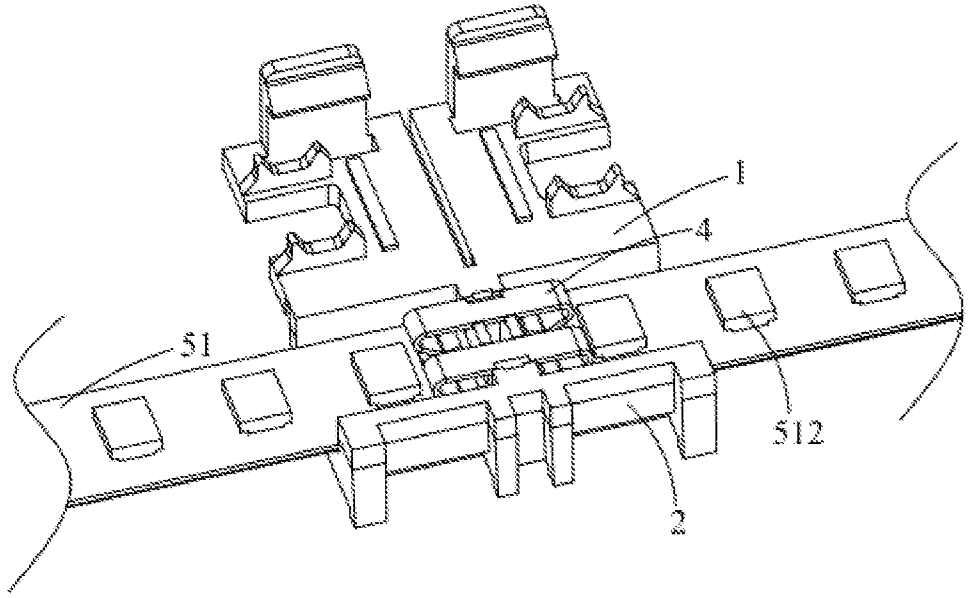
FIG. 14 is a structural schematic diagram of a light strip in a first state.
Figure 15:
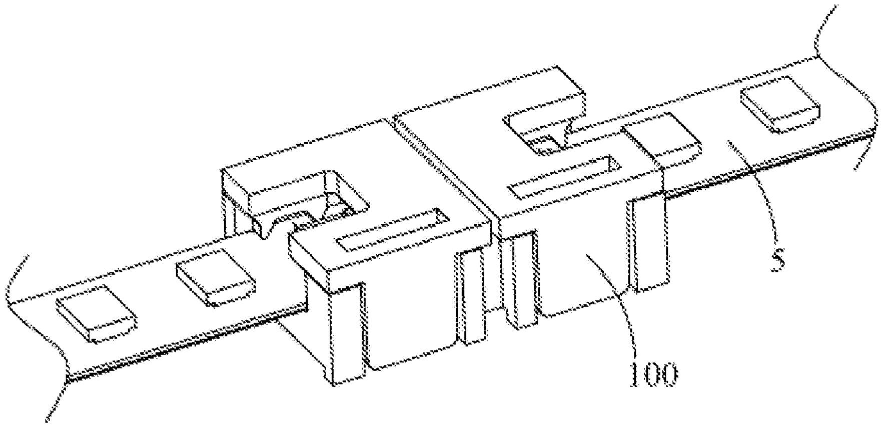
FIG. 15 is a structural schematic diagram of a light strip in a second state.
Figure 16:
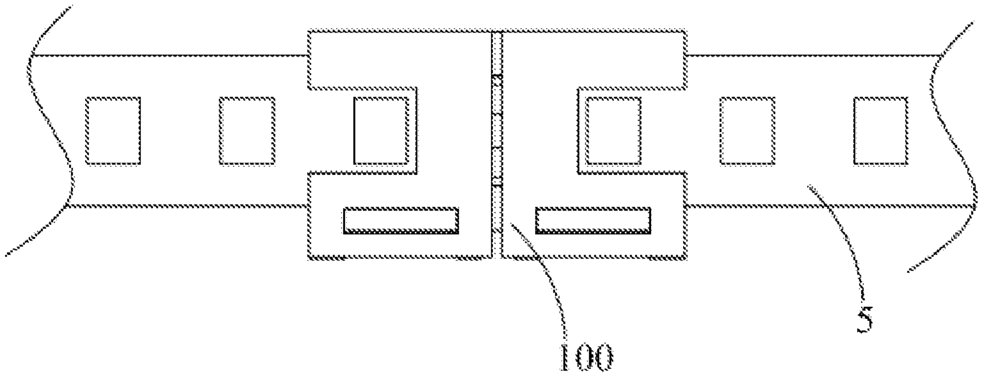
FIG. 16 is a top view of FIG. 15.
Figure 17:
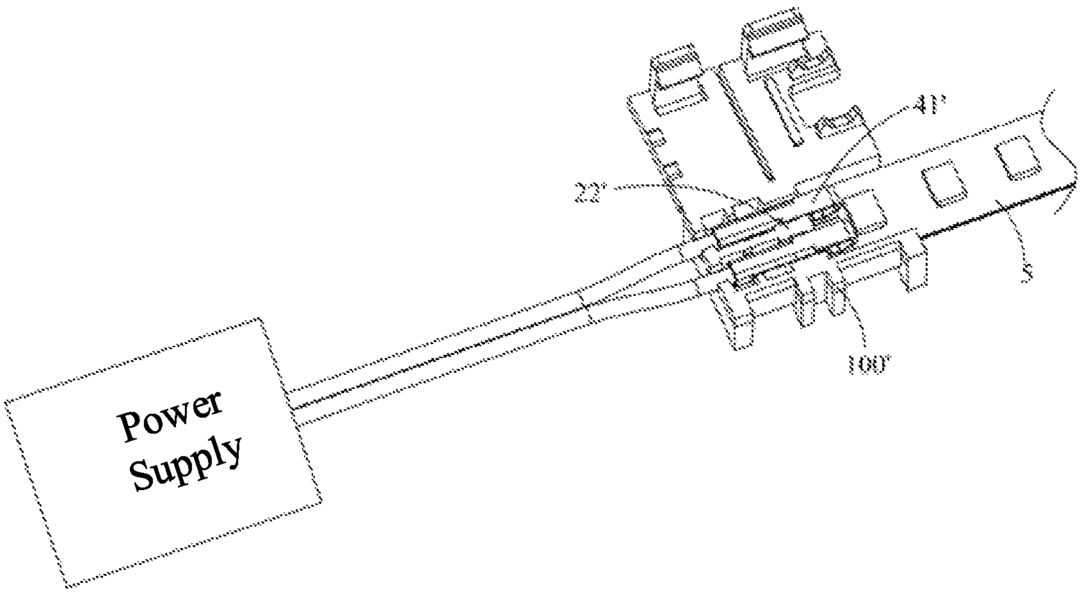
FIG. 17 is a structural schematic diagram of a connection between a light strip connector, a light strip body and an external power supply in the present disclosure.

Please refer to FIG. 5 to FIG. 6 and in conjunction with FIG. 9, the connection portion 422 is at least partially in the fixing groove 25, an end of the connection portion 422 facing the fixing groove 25 is provided with a clamping portion 4221, and the connection portion 422 is fixedly connected to the fixing groove 25 through the clamping portion 4221. In an example, the clamping portion 4221 is connected to the fixing groove 25 in an interference fit manner to improve the stability of the connection between the fixing portion 42 and the base 2. In other examples, the fixing groove 25 may be provided with a give way portion, and the connection portion 422 is fixedly connected to the base 2 through the limitation of the clamping portion 4221 in the give way portion. For example, the clamping portion 4221 is an upwardly inclined spike. Of course, the shape and number of the clamping portion 4221 may be determined according to specific needs, and are not further limited in the present disclosure.

The connection portion 422 includes a first connection portion 422*a* at both ends of the connection portion 422 and a second connection portion 422*b* connected to the first connection portion 422*a*, and the clamping portion 4221 and the first convex portion 4222 are both on the first connection portion 422*a*. A blocking portion 251 matching the first connection portion 422*a* is provided on the side of the fixing groove 25 away from the side wall of the base 2 to limit the first connection portion 422*a*, so as to avoid a situation in which the electrical contact between the light strip body 5 and the conductive terminal 41 is poor due to a serious tilt of the first connection portion 422*a*. The second connection portion 422*b* includes a bent portion 4223, and the bent portion 4223 is formed by bending the second connection portion 422*b* toward the side close to the blocking portion 251 to further improve the fixing stability of the conductive terminal 41. In this example, the first connection portion 422*a* and the second connection portion 422*b* is an integrally formed structure.

In the present example, there are two electrical connection structures 4, the two electrical connection structures 4 are arranged in parallel in the receiving space 3, and the extension direction of the electrical connection structures 4 is identical to the extension direction of the light strip body 5.

Please refer to FIG. 10 to FIG. 17 and in conjunction with FIG. 1 to FIG. 9, the present disclosure further discloses a light strip 200. The light strip 200 includes a light strip body 5 and the aforementioned light strip connector 100, and the light strip body 5 is in the receiving space 3 of the light strip connector 100. An end of the light strip body 5 provided with the second electrical connection portion 511 abuts against the partition 22 of the light strip connector 100, and the second electrical connection portion 511 is electrically connected to the first electrical connection portion 413 of the light strip connector 100 under the snap connection between the cover closure portion 1 and the base 2 of the light strip connector 100. The light strip 200 adopting the light strip connector 100 has a better anti-pulling effect, and improves the stability and reliability of the electrical contact between the light strip body 5 and the conductive terminal 41.

The light strip body 5 includes a substrate 51 and a light-emitting component 512 electrically connected to the substrate 51. In an example, two electrical connection structures 4 of the light strip connector 100 are respectively on both sides of the light-emitting component 512. Such an arrangement can well adapt to the dense arrangement of lamp beads without worrying about the interference of the lamp beads by the conductive terminal 41. The lamp beads are arranged more densely, which can reduce the graininess sense and improve the user's experience. In the present example, the light-emitting component 512 is a lamp bead.

Compared with a rigid PCB, the light strip body 5 in the present disclosure adopts a flexible printed circuit (FPC), which can save more space. In addition, the FPC is connected through the light strip connector 100, which has light weight, high reliability and low cost.

In the present example, two light strip connectors 100 may be used on the light strip 200. It may be known that the light strip connector 100 is an independent structure, so the light strip connector 100 can be applied for splicing between two adjacent light strip bodies 5, or for electrically connecting the light strip body 5 to an external power supply. Specifically, both sides of the partition 22 of a light strip connector 100 respectively abut against a light strip body 5, thereby realizing the splicing of two adjacent light strip bodies 5. For the other light strip connector 100', both sides of the partition 22' of the light strip connector 100' respectively abut against the light strip body 5 and the external power cord. One end of the conductive terminal 41' away from the light strip body 5 is electrically connected to an external power supply through the external power cord to provide power to the light strip body 5. The specific structures of the light strip connector 100' and the light strip connector 100 may not be exactly the same, as long as they can achieve electrical connection with the external power cord.

To sum up, the present disclosure solves the problem that the light strip 200 cannot prevent pulling and dragging through the cooperating extrusion on the light strip body 5 by the matching portion 13 and the first convex portion 4222, and improves the performance of the light strip 200 for preventing pulling and dragging. Secondly, by providing the conductive terminal 41 with the elastic portion 412, the light strip body 5 is electrically connected to the conductive terminal 41 under the elastic resistance of the elastic portion 412, thus achieving high reliability. Moreover, the sufficient deformation of the elastic portion 412 itself can effectively improve the compatibility with light strips 200 of different thicknesses. Furthermore, by arranging the conductive terminals 41 on both sides of the light-emitting component 512, the situation where the light-emitting components 512 are arranged very densely can be well satisfied.

The present disclosure provides a light strip connector and a light strip to solve the problem that the elasticity of the spring sheet is poor, the light strip cannot prevent pulling and dragging, or can prevent pulling and dragging but cannot satisfy the situation where the lamp beads are arranged densely, so as to improve the reliability of the operation of the light strip connector.

In order to realize the above object, the present disclosure provides a light strip connector, for connecting adjacent light strips and/or connecting a light strip and a power cord, the light strip comprises a light strip body, and the light strip connector comprises a cover closure portion, a base and at least one electrical connection structure; a receiving space is formed between the cover closure portion and the base, the electrical connection structure is in the receiving space, and the electrical connection structure comprises a conductive terminal electrically connected to the light strip body, and a fixing portion fixedly connected to the conductive terminal; a fixing groove is provided on the base, the fixing portion is at least partially received in the fixing groove, and an accommodating space for accommodating the light strip body is provided between the conductive terminal and the fixing portion.

As a further improvement of the present disclosure, an end of the fixing portion away from the electrical connection structure is provided with a first convex portion extending in a direction close to the cover closure portion, and a side of the cover closure portion close to the base is provided with a matching portion that matches the first convex portion; the matching portion comprises a groove and a second convex portion at both ends of the groove and extending in a direction away from the cover closure portion, a projection of the first convex portion on the cover closure portion is in the groove, and a plane where a highest point of the first convex portion is located is higher than a plane where a lowest point of the second convex portion is located.

As a further improvement of the present disclosure, the fixing portion comprises a support portion fixedly connected below the conductive terminal and a connection portion below the support portion; a side wall of the support portion close to the base is provided with a first snap portion, the base is provided with a second snap portion at a position corresponding to the first snap portion, and the support portion is snap-connected to the base through snap-fitting of the first snap portion and the second snap portion.

As a further improvement of the present disclosure, the connection portion is at least partially in the fixing groove, an end of the connection portion facing the fixing groove is provided with a clamping portion, and the connection portion is fixedly connected to the fixing groove through the clamping portion.

As a further improvement of the present disclosure, the connection portion comprises a first connection portion at both ends of the connection portion and a second connection portion connected to the first connection portion, and a side of the fixing groove away from a side wall of the base is provided with a blocking portion matching the first connection portion to limit a connection to the first connection portion.

As a further improvement of the present disclosure, the conductive terminal comprises a base portion and an elastic portion formed by bending an end of the base portion toward a side close to the base, a first electrical connection portion is provided on the elastic portion, the light strip body is provided with a second electrical connection portion at a position corresponding to the first electrical connection portion, and the conductive terminal is electrically connected to the light strip body under a cooperation of the first electrical connection portion and the second electrical connection portion.

As a further improvement of the present disclosure, in a direction perpendicular to the light strip body, a plane where a lowest point of the elastic portion is located is lower than a plane where a highest point of the first convex portion is located.

As a further improvement of the present disclosure, the base further comprises a partition in the receiving space, a gap is provided between the partition and a side wall of the base, and the electrical connection structure is at least partially received in the fixing groove after the electrical connection structure passes through the gap.

As a further improvement of the present disclosure, there are two electrical connection structures, the two electrical connection structures are arranged in parallel in the receiving space, and an extension direction of the electrical connection structures is identical to an extension direction of the light strip body.

To further realize the above object, the present disclosure further discloses a light strip, the light strip comprises a light strip body and the above light strip connector, an end of the light strip body provided with a second electrical connection portion abuts against a partition of the light strip connector, and the second electrical connection portion is electrically connected to a first electrical connection portion of the light strip connector under a snap connection between the cover closure portion and the base of the light strip connector; and the light strip body comprises a substrate and a light-emitting component electrically connected to the substrate, and two electrical connection structures of the light strip connector are respectively on both sides of the light-emitting component.

The beneficial effects of the present disclosure are as follows. The present disclosure solves the problem that the light strip cannot prevent pulling and dragging through the cooperating extrusion on the light strip body by the matching portion and the first convex portion, and improves the performance of the light strip for preventing pulling and dragging. Secondly, by providing a conductive terminal with an elastic portion, the light strip body is electrically connected to the conductive terminal under the elastic resistance of the elastic portion, thus achieving high reliability. Moreover, the sufficient deformation of the elastic portion itself can effectively improve the compatibility with light strips of different thicknesses. Furthermore, by arranging the conductive terminals on both sides of the light-emitting component, the situation where the light-emitting components are arranged very densely can be well satisfied.

The above-mentioned examples are merely used to illustrate the technical solutions of the present disclosure, and not to limit the present disclosure. Although the present disclosure is described in detail with reference to the examples, those of ordinary skill in the art should understand that modifications or equivalent substitutions may be made to the technical solutions of the present disclosure without departing from the spirit and scope of the technical solutions of the present disclosure.

What is claimed is:

1. A light strip connector for connecting adjacent light strips and/or connecting a light strip and a power cord, wherein:
   - the light strip comprises a light strip body, and the light strip connector comprises a cover closure portion, a base and at least one electrical connection structure;
   - a receiving space is formed between the cover closure portion and the base, the electrical connection structure is in the receiving space, and the electrical connection structure comprises a conductive terminal electrically connected to the light strip body, and a fixing portion fixedly connected to the conductive terminal; and
   - a fixing groove is provided on the base, the fixing portion is at least partially received in the fixing groove, and an accommodating space for accommodating the light strip body is provided between the conductive terminal and the fixing portion.

2. The light strip connector according to claim 1, wherein:
   - an end of the fixing portion away from the electrical connection structure is provided with a first convex portion extending in a direction close to the cover closure portion, and a side of the cover closure portion close to the base is provided with a matching portion that matches the first convex portion; and
   - the matching portion comprises a groove and a second convex portion at both ends of the groove and extending in a direction away from the cover closure portion, a projection of the first convex portion on the cover closure portion is in the groove, and a plane where a highest point of the first convex portion is located is higher than a plane where a lowest point of the second convex portion is located.

3. The light strip connector according to claim 1, wherein:
   - the fixing portion comprises a support portion fixedly connected below the conductive terminal and a connection portion below the support portion; and
   - a side wall of the support portion close to the base is provided with a first snap portion, the base is provided with a second snap portion at a position corresponding to the first snap portion, and the support portion is snap-connected to the base through snap-fitting of the first snap portion and the second snap portion.

4. The light strip connector according to claim 3, wherein the connection portion is at least partially in the fixing groove, an end of the connection portion facing the fixing groove is provided with a clamping portion, and the connection portion is fixedly connected to the fixing groove through the clamping portion.

5. The light strip connector according to claim 3, wherein:
   - the connection portion comprises a first connection portion at both ends of the connection portion and a second connection portion connected to the first connection portion, and
   - a side of the fixing groove away from a side wall of the base is provided with a blocking portion matching the first connection portion to limit a connection to the first connection portion.

6. The light strip connector according to claim 2, wherein:
   - the conductive terminal comprises a base portion and an elastic portion formed by bending an end of the base portion toward a side close to the base, a first electrical connection portion is provided on the elastic portion, the light strip body is provided with a second electrical connection portion at a position corresponding to the first electrical connection portion, and
   - the conductive terminal is electrically connected to the light strip body under a cooperation of the first electrical connection portion and the second electrical connection portion.

7. The light strip connector according to claim 6, wherein in a direction perpendicular to the light strip body, a plane where a lowest point of the elastic portion is located is lower than a plane where a highest point of the first convex portion is located.

8. The light strip connector according to claim 1, wherein the base further comprises a partition in the receiving space, a gap is provided between the partition and a side wall of the base, and the electrical connection structure is at least partially received in the fixing groove after the electrical connection structure passes through the gap.

9. The light strip connector according to claim 1, wherein there are two electrical connection structures, the two electrical connection structures are arranged in parallel in the receiving space, and an extension direction of the electrical connection structures is identical to an extension direction of the light strip body.

10. Alight strip, comprising a light strip body and a light strip connector, wherein:

the light strip connector is for connecting adjacent light strips and/or connecting a light strip and a power cord, and wherein:

the light strip comprises a light strip body, and the light strip connector comprises a cover closure portion, a base and at least one electrical connection structure;

a receiving space is formed between the cover closure portion and the base, the electrical connection structure is in the receiving space, and the electrical connection structure comprises a conductive terminal electrically connected to the light strip body, and a fixing portion fixedly connected to the conductive terminal; and a fixing groove is provided on the base, the fixing portion is at least partially received in the fixing groove, and an accommodating space for accommodating the light strip body is provided between the conductive terminal and the fixing portion; and an end of the light strip body provided with a second electrical connection portion abuts against a partition of the light strip connector, and the second electrical connection portion is electrically connected to a first electrical connection portion of the light strip connector under a snap connection between the cover closure portion and the base of the light strip connector; and the light strip body comprises a substrate and a light-emitting component electrically connected to the substrate, and two electrical connection structures of the light strip connector are on both sides of the light-emitting component.

* * * * *